(12) United States Patent
Wu et al.

(10) Patent No.: US 12,512,637 B1
(45) Date of Patent: Dec. 30, 2025

(54) PLUG ADAPTER

(71) Applicant: Dongguan Heincro Technology Co., Ltd, Dongguan (CN)

(72) Inventors: Xuexiang Wu, Guangdong (CN); Zepeng Zheng, Shenzhen (CN); Shouming Chen, Danzhou (CN)

(73) Assignee: Dongguan Heincro Technology Co., Ltd, Dongguan (CN)

( * ) Notice: Subject to any disclaimer, the term of this patent is extended or adjusted under 35 U.S.C. 154(b) by 0 days.

(21) Appl. No.: 19/257,588

(22) Filed: Jul. 2, 2025

(30) Foreign Application Priority Data

Jun. 19, 2025 (CN) .......................... 202521260925.X

(51) Int. Cl.
*H01R 27/00* (2006.01)
(52) U.S. Cl.
CPC .................................... *H01R 27/00* (2013.01)
(58) Field of Classification Search
CPC ....................................................... H01R 27/00
USPC ......................................................... 439/105
See application file for complete search history.

(56) References Cited

U.S. PATENT DOCUMENTS

| | | | | |
|---|---|---|---|---|
| 7,220,139 B1* | 5/2007 | Chang | ..................... | H01R 31/06 439/172 |
| 7,354,286 B1* | 4/2008 | Lee | ...................... | H01R 13/652 439/652 |
| 7,857,639 B1* | 12/2010 | Chang | ..................... | H01R 27/00 439/131 |
| 8,142,208 B2* | 3/2012 | Ruffner | ............... | H01R 13/4534 439/105 |
| 8,157,578 B2* | 4/2012 | Lee | ......................... | H01R 27/00 439/223 |
| 8,753,149 B2* | 6/2014 | Lee | ......................... | H01R 27/02 439/653 |
| 9,577,395 B2* | 2/2017 | Ma | ......................... | H01R 31/08 |
| D892,055 S * | 8/2020 | Wang | ........................ | D13/137.2 |
| 10,784,637 B2* | 9/2020 | Barnett | ................. | H01R 31/06 |
| 11,728,597 B1* | 8/2023 | Lee | ...................... | H01R 13/642 439/134 |
| 11,824,309 B2* | 11/2023 | Abouismail | ....... | H01R 13/6395 |
| 2007/0293072 A1* | 12/2007 | Honton | .................. | H01R 27/00 439/159 |
| 2011/0086527 A1* | 4/2011 | Ruffner | ................. | H01R 27/00 439/652 |
| 2015/0099380 A1* | 4/2015 | Ruffner | ............. | H01R 13/4534 439/137 |
| 2018/0337501 A1* | 11/2018 | Cai | .................... | H01R 13/6485 |
| 2021/0376546 A1* | 12/2021 | Barnett | .................. | H01R 27/00 |

(Continued)

*Primary Examiner* — Harshad C Patel
(74) *Attorney, Agent, or Firm* — Nicholas Makridakis

(57) ABSTRACT

A plug adapter is provided, including a housing, a rotating housing, a panel, a first plug assembly, a second plug assembly, and a third plug assembly. The rotating housing is rotatably connected to an inner wall of the housing, the panel is disposed over the rotating housing, and the first, the second, and the third plug assemblies are disposed within the rotating housing and are arranged below the panel. A guide protrusion is disposed on an inner wall of the rotating housing, and the guide protrusion is configured to assist the first, the second and the third plug assemblies to move upward, respectively. Multiple guide rods are disposed below the panel and are configured to guide an axial movement of the first, the second, and the third plug assemblies, respectively. And the guide rods are sleeved with reset springs.

7 Claims, 10 Drawing Sheets

(56) References Cited

U.S. PATENT DOCUMENTS

| | | | |
|---|---|---|---|
| 2022/0077640 A1* | 3/2022 | Frei | H01R 27/00 |
| 2022/0320809 A1* | 10/2022 | Choi | H01R 31/06 |
| 2024/0120695 A1* | 4/2024 | Liu | H01R 13/05 |

* cited by examiner

PLUG ADAPTER

TECHNICAL FIELD

The present application relates to the technical field of electrical plugs, and more particularly to a plug adapter.

BACKGROUND

As globalization accelerates, international exchanges and cooperation are becoming more frequent. It has become common for people to carry various electronic devices when traveling, conducting business, or engaging in international transactions. However, international electrical standards have not been unified, with most countries having different plug and socket specifications. This results in the inability of electronic devices to directly fit into local power sockets when using electronic devices in different countries, causing great inconvenience to people's lives and work.

To address this issue, plug adapters have been launched on the market. These plug adapters typically adopt a detachable socket and plug combination design, the socket is configured to electrically connect with a domestic electrical plug, while the plug is configured to connect with a foreign power socket. When using in different countries, users only need to replace different plugs accordingly, but the socket remain compatible with the replaced plug.

Although the plug adapters may alleviate the problem of mismatched plugs and sockets to some extent, there still have the following drawbacks. Firstly, due to the significant differences in socket standards between different countries, users need to carry multiple plugs of different specifications, which undoubtedly increase the burden of luggage when traveling and cause inconvenience. Secondly, carrying multiple plugs may also increase the risk of losing them. Once lost, it may be difficult to find suitable alternatives abroad, affecting the normal use of electronic devices and causing inconvenience to users' work and daily life.

Therefore, it is necessary to provide a plug adapter to solve the above technical problems.

SUMMARY

The present disclosure aims to provide a plug adapter to address the problems that the existing plug adapters need to carry multiple plugs of different specifications, resulting in a heavy baggage burden and easy loss, affecting the use of electronic devices.

To achieve the above objectives, the present disclosure adopts the following technical solutions.

In some embodiments of the present disclosure, a plug adapter is provided, including a housing, a rotating housing, a panel, a first plug assembly, a second plug assembly, and a third plug assembly. The rotating housing is rotatably connected to an inner wall of the housing, the panel is disposed over the rotating housing, and the first, the second, and the third plug assemblies are disposed within the rotating housing and are arranged below the panel.

A guide protrusion is disposed on the inner wall of the rotating housing, and the guide protrusion is configured to assist the first, the second and the third plug assemblies to move upward, respectively.

Multiple guide rods are disposed below the panel and are configured to guide an axial movement of the first, the second, and the third plug assemblies, respectively. The guide rods are sleeved with reset springs, and the reset springs are configured to reset the first, the second, and the third plug assemblies, respectively.

Preferably, the first plug assembly includes a first moving seat, a first metal pin, a first guide block, and a fourth moving seat. The first moving seat and the fourth moving seat are slidably connected to an outer side of the guide rods, respectively; and the first metal pin is fixedly installed on a top of the first moving seat and the fourth moving seat. The first guide block is fixedly installed on a side of the first moving seat, one of the reset springs is arranged at the top of the first moving seat and the fourth moving seat.

Preferably, the second plug assembly includes a second moving seat, a second guide block, and a second metal pin. The second moving seat is slidably connected to an outer side of the guide rods, the second guide block is fixedly installed on a side of the second moving seat, the second metal pin is rotatably connected to a top of the second moving seat, and the reset springs are arranged at the top of the second moving seat.

Preferably, the third plug assembly includes an installation housing, a third guide block, a threaded stud, a driven threaded pipe, a support column, a third moving seat, and a third metal pin. The installation housing is slidably connected to an outer side of the guide rod, and the third guide block is fixedly installed on an outer wall of the installation housing. A bottom of the threaded stud is fixedly installed on a bottom of the inner wall of the outer housing, and the driven threaded pipe is configured to engage with a side of the threaded stud. The support column is rotatably connected to an inner wall of the driven threaded pipe, with its top and bottom being fixedly installed at a top and a bottom of the inner wall of the installation housing, respectively. The third moving seat is configured to engage with an outer side of the driven threaded pipe, and the third metal pin is fixedly installed on a top of the third moving seat, and the reset springs are located on a side of the top of the installation housing.

Preferably, the plug adapter further includes an elastic sheet, toothed blocks and a gear ring. The toothed blocks are configured to engage with a periphery of the gear ring, and the elastic sheet is fixedly installed on a side of the toothed blocks.

Preferably, a mounting groove is provided on the inner side of the housing, and a groove is provided on the outer side of the rotating housing.

Preferably, the elastic sheet is fixedly installed on an inner wall of the mounting groove, and the gear ring is fixedly installed on an inner wall of the groove.

Compared with related technologies, the plug adapter of the present disclosure has at least the following beneficial effects.

The plug adapter of the present disclosure, through mutual cooperation of the components, such as the housing, the rotating housing, the guide protrusion, the panel, the guide rods, the reset springs, and the first, the second, and the third plug assemblies, when in use, users do not need to carry multiple plugs of different specifications. By simply turning the rotating housing, it can switch between different plug assemblies, ensuring compatibility with various power sockets in different countries. This can effectively reduce the luggage burden during travel and also can reduce the risk of electronic device usage being affected by lost plugs.

Figure 1:
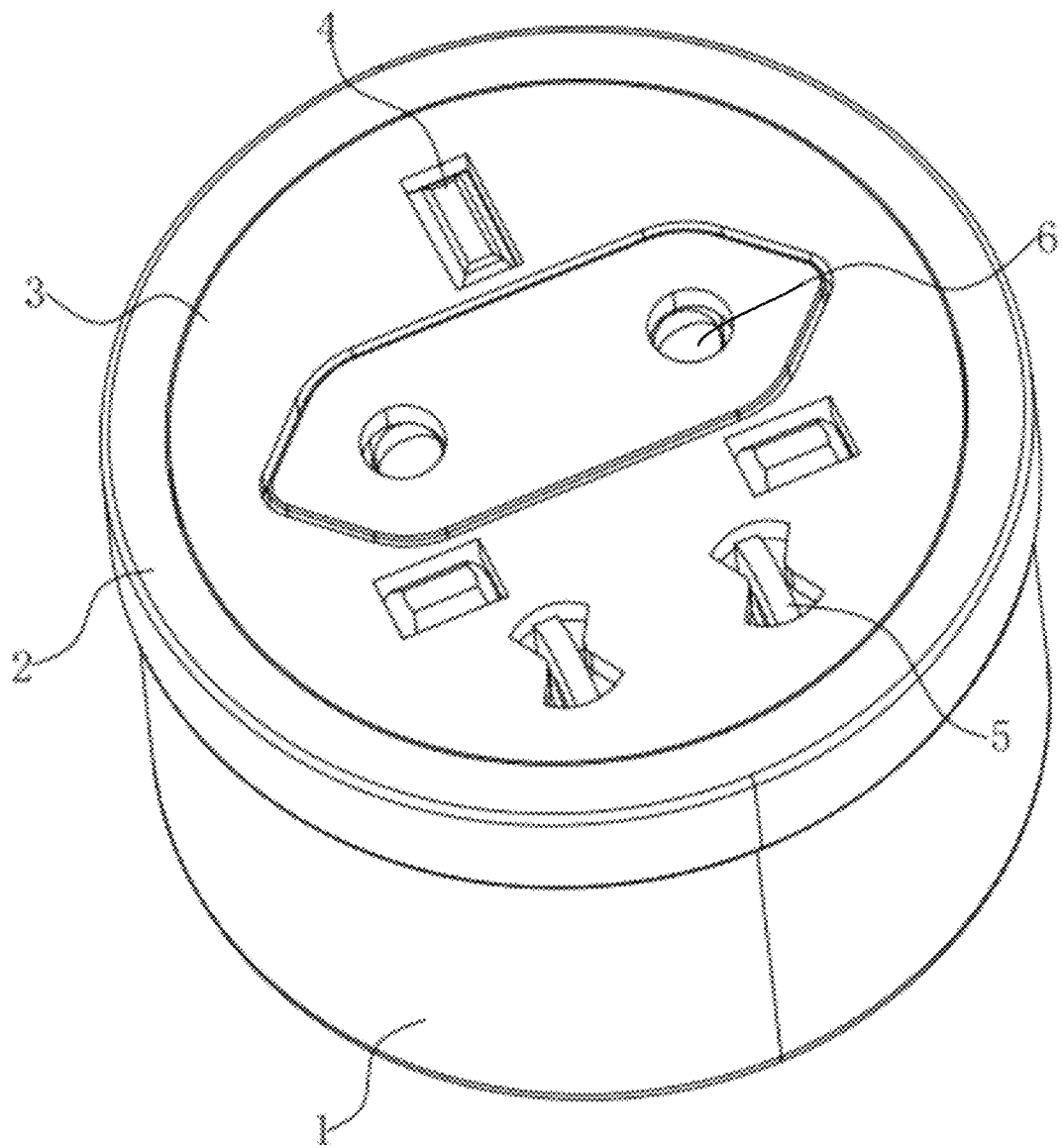
FIG. 1 shows a structural schematic diagram of a plug adapter in accordance with some embodiments of the present disclosure.

In the drawings, the designated reference numerals are as follows. 1. Housing, 2. Rotating housing, 21. Guide protrusion, 3. Panel, 31. Guide rod, 32. Reset spring, 4. First plug assembly, 41. First moving seat, 42. First metal pin, 43. First guide block, 44. Fourth moving seat, 5. Second plug assembly, 51. Second moving seat, 52. Second guide block, 53. Second metal pin, 6. Third plug assembly, 61. Installation housing, 62. Third guide block, 63. Threaded column, 64. Driven threaded pipe, 65. Support column, 66. Third moving seat, 67. Third metal pin, 7. Mounting groove, 71. Elastic plate, 72. Gear block, 8. Groove, 81. Gear ring.

DETAILED DESCRIPTION OF THE EMBODIMENTS

The present disclosure is further described below with reference to the drawings and embodiments.

Figure 2:
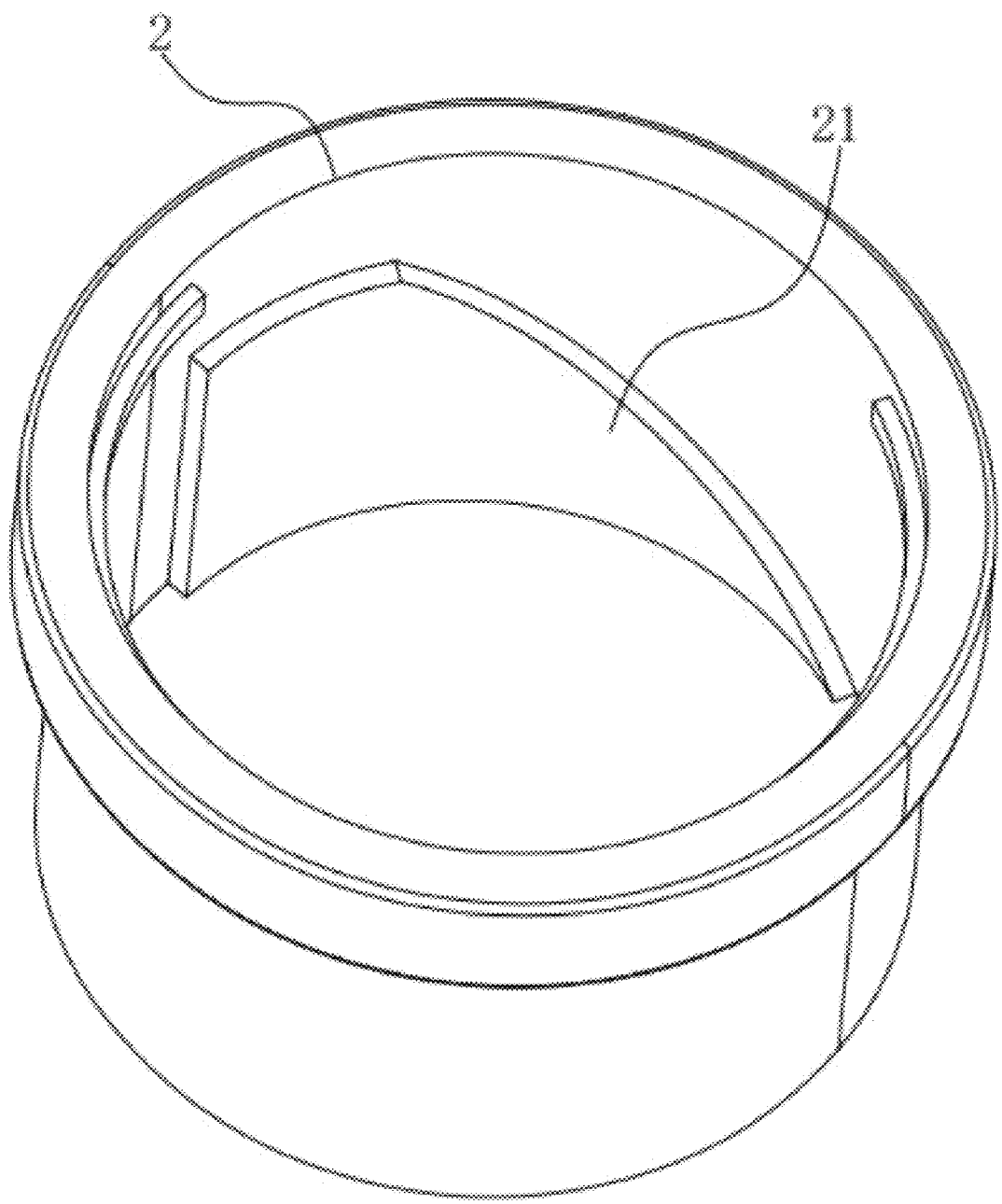
FIG. 2 shows a structural schematic diagram of a rotating housing shown in FIG. 1.
Figure 3:
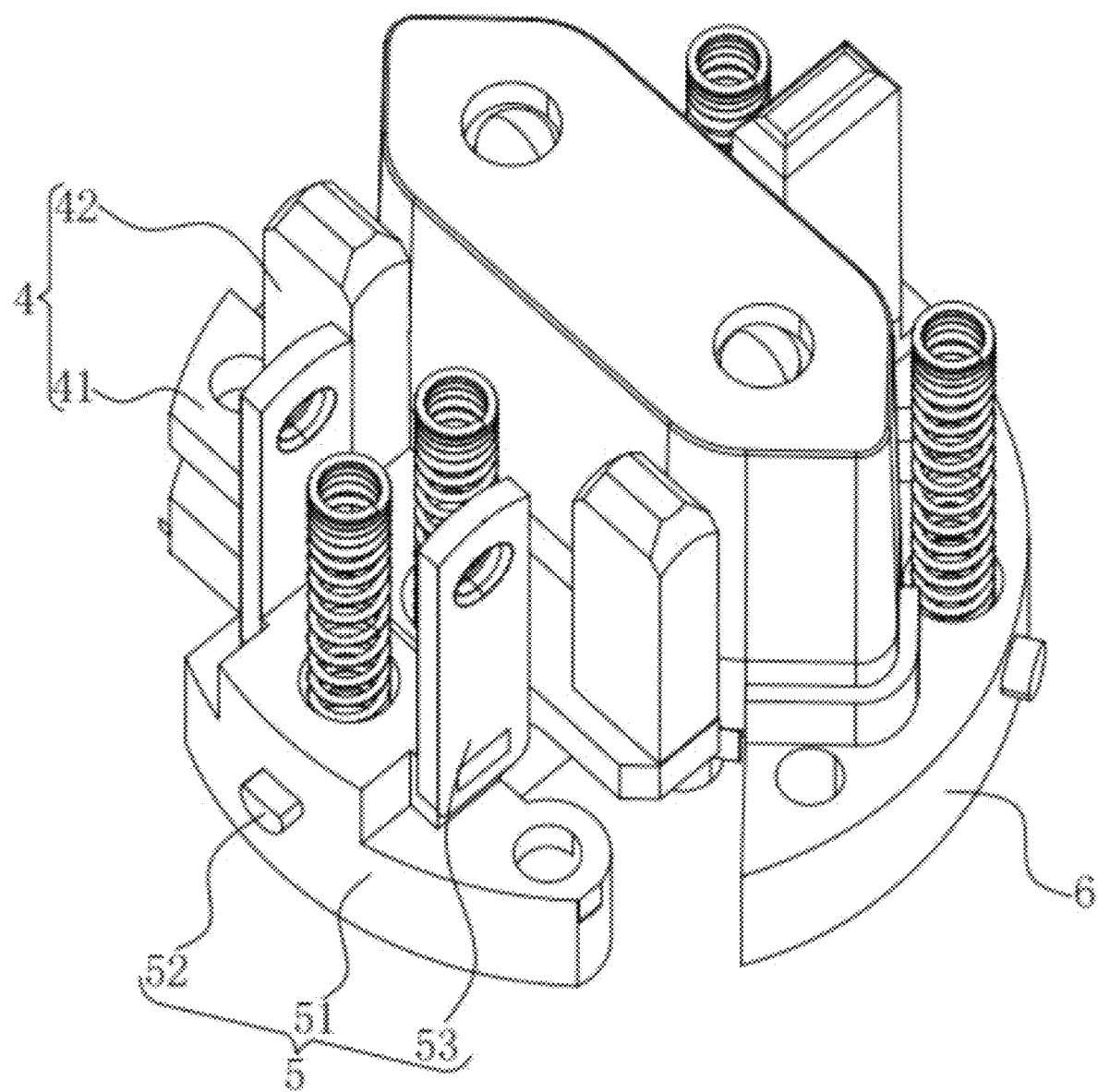
FIG. 3 shows a structural schematic diagram of a first, a second and a third plug assemblies shown in FIG. 1.
Figure 4:
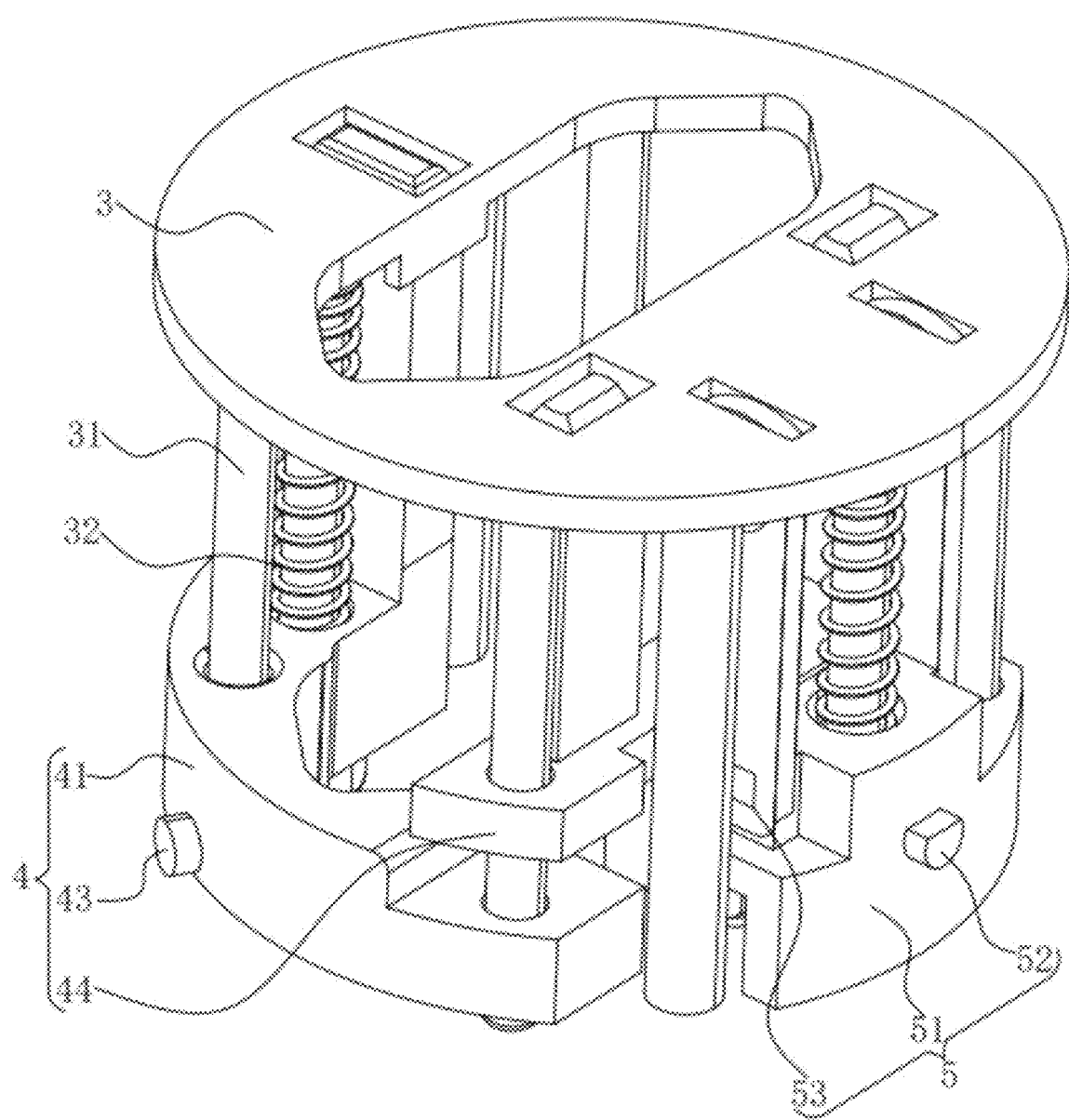
FIG. 4 shows a structural schematic diagram of the first and second plug assemblies and a panel shown in FIG. 1.
Figure 5:
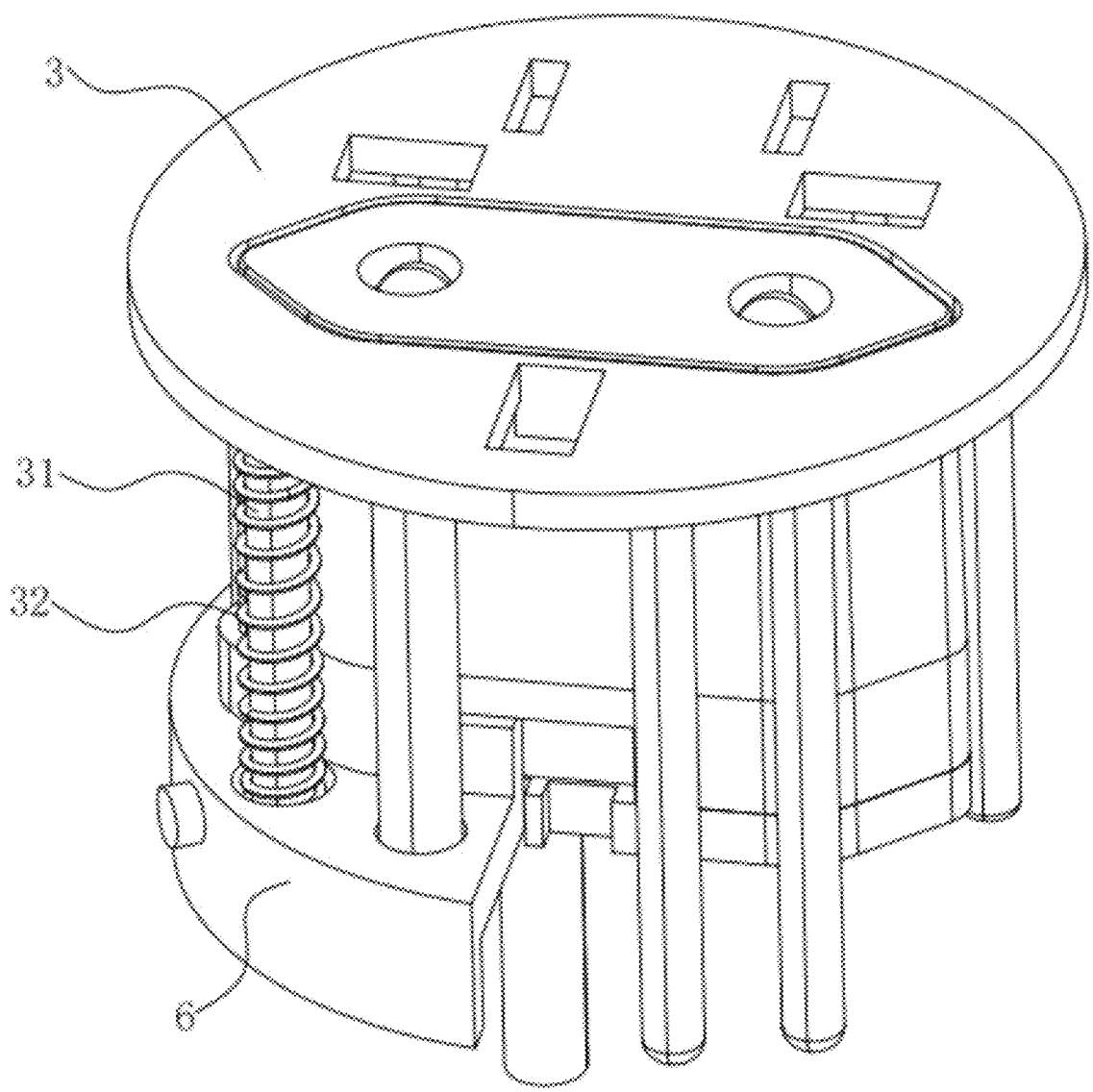
FIG. 5 shows a structural schematic diagram of the third plug assembly and the panel shown in FIG. 1.
Figure 6:
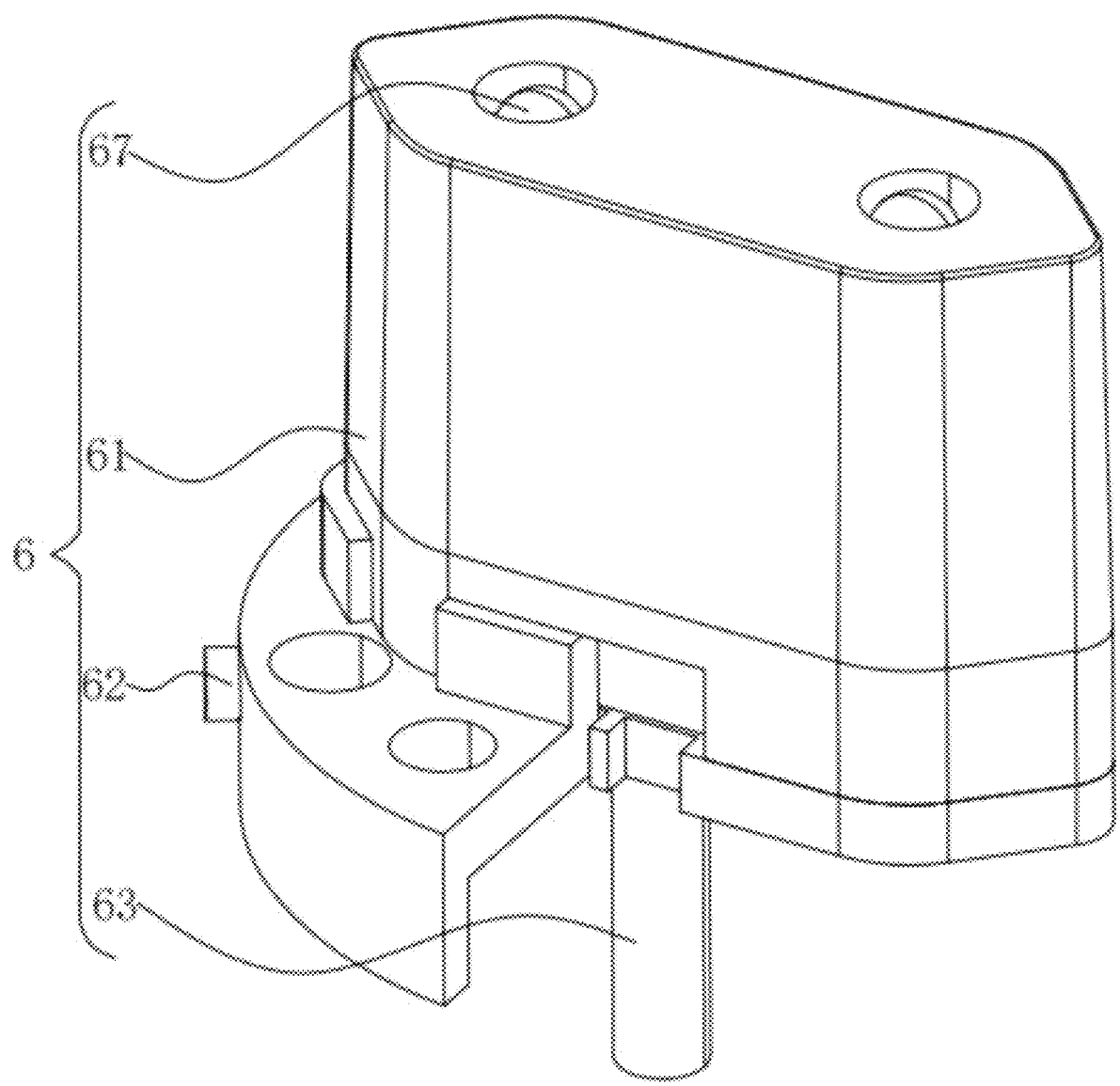
FIG. 6 shows a structural schematic diagram of the third plug assembly shown in FIG. 5.
Figure 7:
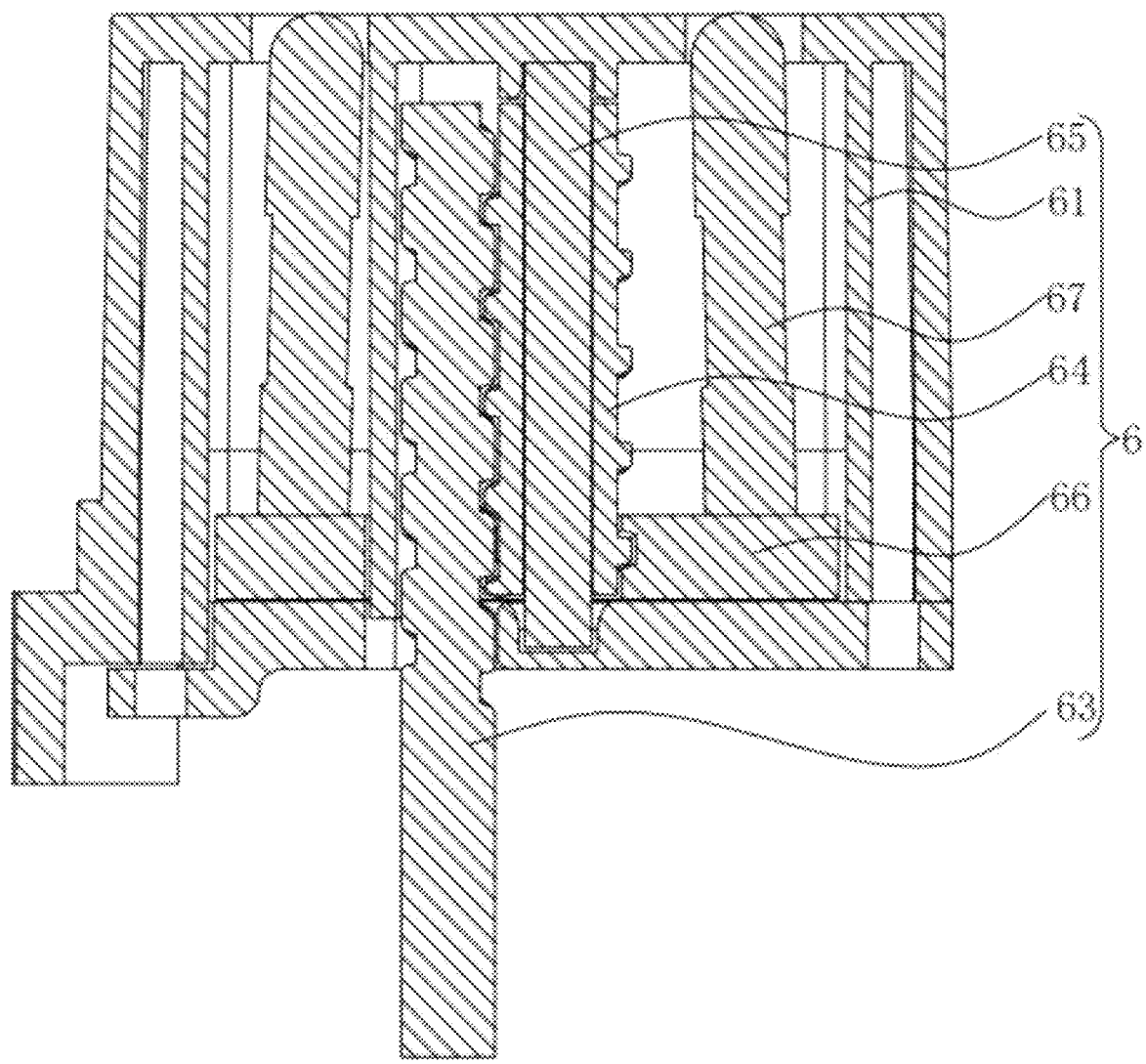
FIG. 7 shows a sectional view of the third plug assembly shown in FIG. 6.
Figure 8:
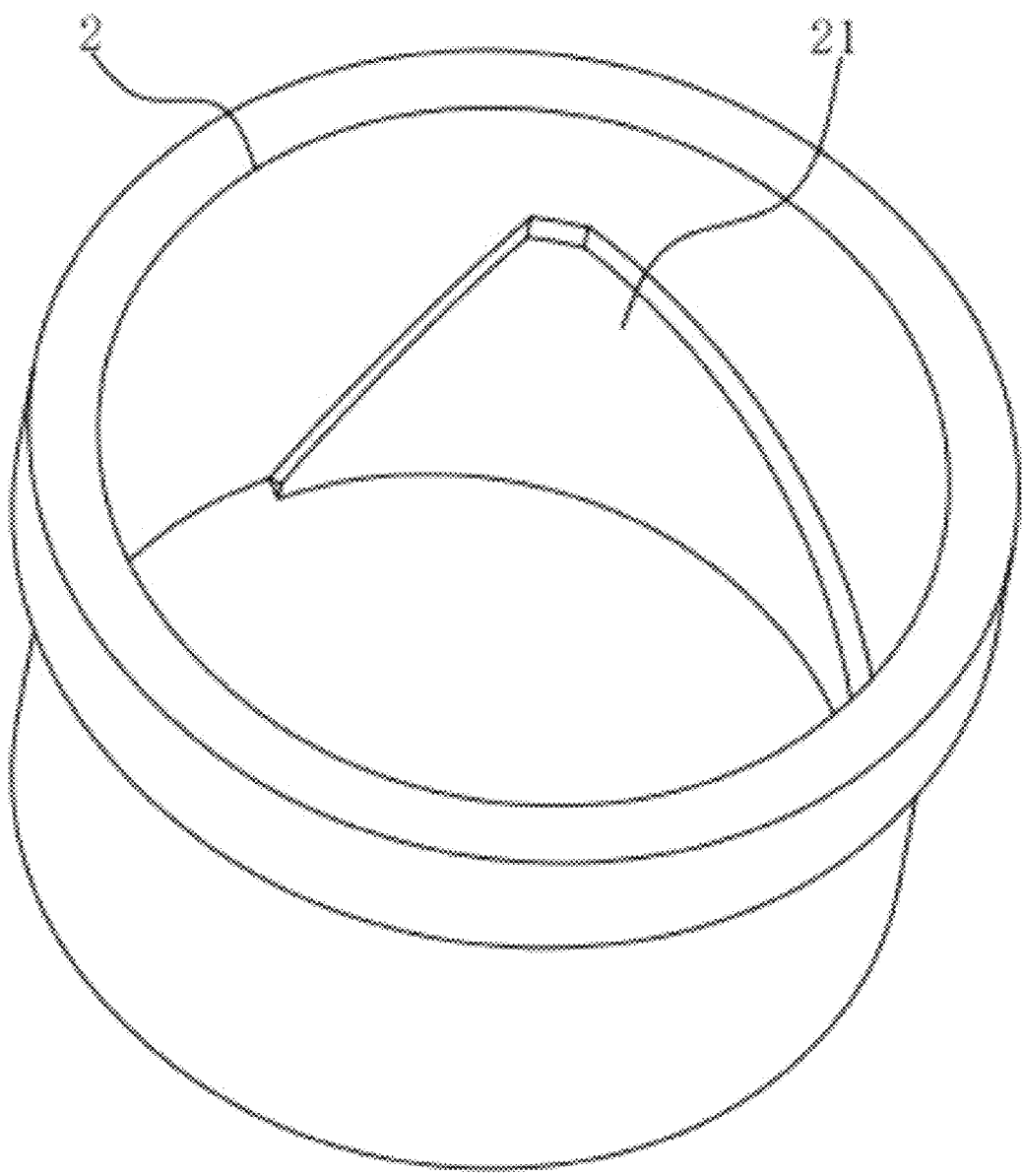
FIG. 8 shows another structural schematic diagram of a guide protrusion shown in FIG. 2.

Referring to FIG. 1 to FIG. 8, wherein FIG. 1 shows a structural schematic diagram of a plug adapter in accordance with some embodiments of the present disclosure, FIG. 2 shows a structural schematic diagram of a rotating housing shown in FIG. 1, FIG. 3 shows a structural schematic diagram of a first, a second and a third plug assemblies shown in FIG. 1, FIG. 4 shows a structural schematic diagram of the first and the second plug assemblies and a panel shown in FIG. 1, FIG. 5 shows a structural schematic diagram of the third plug assembly and the panel shown in FIG. 1, FIG. 6 shows a structural schematic diagram of the third plug assembly shown in FIG. 5, FIG. 7 shows a sectional view of the third plug assembly shown in FIG. 6, FIG. 8 shows another structural schematic diagram of a guide protrusion shown in FIG. 2.

In some embodiments of the present disclosure, a plug adapter is provided, including a housing 1, a rotating housing 2, a panel 3, a first plug assembly 4, a second plug assembly 5, and a third plug assembly 6. The rotating housing 2 is rotatably connected to an inner wall of the housing 1. The panel 3 is disposed over the rotating housing 2. The first plug assembly 4, the second plug assembly 5, and the third plug assembly 6 are disposed within the rotating housing 2 and are arranged below the panel 3.

A guiding protrusion 21 is disposed on the inner wall of the rotating housing 2 and is configured to assist the first plug assembly 4, the second plug assembly 5 and the third plug assembly 6 to move upward.

Multiple guide rods 31 are disposed below the panel 3 and are configured to guide an axial movement of the first, the second, and the third plug assemblies 4, 5, 6, respectively.

The guide rods are sleeved with reset springs 32, which are configured to reset the first, the second, and the third plug assemblies 4, 5, 6, respectively.

Bottom ends of the guide rods 31 are fixedly installed at the bottom within the housing 1, which is used for installing the panel 3 and the housing 1.

The first plug assembly 4 includes a first moving seat 41, a first metal pin 42, a first guide block 43, and a fourth moving seat 44. The first moving seat 41 and the fourth moving seat 44 are both slidably connected to an outer side of the guide rod 31. The first metal pin 42 is fixedly installed on a top of the first moving seat 41 and the fourth moving seat 44. The first guide block 43 is fixedly installed on a side of the first moving seat 41. One of the reset springs 32 is positioned at the top of both the first moving seat 41 and the fourth moving seat 44.

The second plug assembly 5 includes a second moving seat 51, a second guide block 52, and a second metal pin 53. The second moving seat 51 is slidably connected to an outer side of the guide rod 31. The second guide block 52 is fixedly installed on a side of the second moving seat 51. The second metal pin 53 is rotatably connected to a top of the second moving seat 51. The reset springs 32 are positioned at the top of the second moving seat 51.

The third plug assembly 6 includes an installation housing 61, a third guide block 62, a threaded stud 63, a driven threaded pipe 64, a support column 65, a third moving seat 66, and a third metal pin 67. The installation housing 61 is slidably connected to an outer side of the guide rod 31. The third guide block 62 is fixedly installed on an outer wall of the installation housing 61. A bottom of the threaded stud 63 is fixedly installed on the bottom of the inner wall of the housing 1. The driven threaded pipe 64 is configured to engage with a side of the threaded stud 63. The support column 65 is rotatably connected to an inner wall of the driven threaded pipe 64. The top and bottom of the support column 65 are fixedly installed at the top and bottom of the inner wall of the installation housing 61, respectively. The third moving seat 66 is configured to engage with an outer side of the driven threaded pipe 64. The third metal pin 67 is fixedly installed on the top of the third moving seat 66. One of the reset springs 32 is set on a side of the top of the installation housing 61.

Referring to FIG. 8, the guide protrusion 21 may also be configured to be inclined on both sides thereon. When in use, the user can rotate the rotary housing 2 forward or backward to guide the first plug assembly 4, the second plug assembly 5 and the third plug assembly 6.

The first plug assembly 4 is configured as a British standard plug, the second plug assembly 5 is configured as is a US, Australian and Argentine standard plug, and the third plug assembly 6 is configured as a European standard plug, which can be used in different countries.

The first metal pin 42, the second metal pin 42 and the third metal pin 67 are electrically connected to each other through wires, and according to the use of the plug assemblies, it can be connected to a mobile phone power cords or other electrical power cords to electrically connect electrical devices with sockets in different countries.

The outer side of the threaded stud 63 is provided with threaded grooves that match the threaded strips on the outer side of the driven threaded pipe 64. There is a gap between the threaded strip and the threaded groove, allowing the driven threaded pipe 64 to rotate as it moves along the side of the threaded stud 63. Additionally, the inner side of the third moving seat 66 is provided with threaded grooves accordingly, which can synchronously drive the third moving seat 66 to move up and down.

Two second metal pins 53 installed on the second mobile base 51 can rotate 360° around a central point and maintaining continuous power supply during use. The second plug assembly 5 is a US standard plug, which can be converted to the Australian/Argentine standard plug by rotating the second metal pins 53 during use.

Referring to FIG. 4, when the first moving seat 41 moves upward, the fourth moving seat 44 will be moved upward synchronously. The first metal pin 42 is installed at the top of the first moving seat 41, and two first metal pins 42 are fixedly installed at the top of the fourth moving seat 44.

The working principle of the plug adapter of the present disclosure is described as follows.

When the user needs to use the first plug assembly 4, he/she holds the housing 1 and rotate the rotating housing 2. At this time, the first guide block 43 of the first plug assembly 4 moves upward along the inclined surface of the guide protrusion 21. The first guide block 43 simultaneously drives the first moving seat 41 and the fourth moving seat 44 to slide along the outer side of the guide rod 31, compressing the reset spring 32. When the first guide block 43 reaches the top plane of the guide protrusion 21, the insertion point of the first metal pin 42 will fully move to the top of the panel 3, allowing the first plug assembly 4 to connect with corresponding socket. To retract the first metal pin 42, continue rotating the rotating housing 2, causing the first guide block 43 to move downward along another inclined surface on the side of the guide protrusion 21, under the elastic force of the reset spring 32, and the first metal pin 42 will be retracted.

Continue to rotate the rotating housing 2, the second guide block 52 of the second plug assembly 5 will come into contact with the inclined surface of the guide protrusion 21. The second guide block 52 will move upward along the inclined surface of the guide protrusion 21, causing the second moving seat 51 to slide along the outer side of the guide rod 31 and compress the reset spring 32. When the second guide block 52 reaches the top plane of the guide protrusion 21, the connection point of the second metal pin 53 will fully extend to the top of the panel 3, allowing it to connect to the corresponding socket. To retract the second metal pin 53, rotate the rotating housing 2 again. The second guide block 52 will slide down along the other inclined surface of the guide protrusion 21 under the action of the reset spring 32, and the second metal pin 53 will be retracted.

Continue to rotate the rotating housing 2, the third guide block 62 of the third plug assembly 6 will come into contact with the inclined surface of the guide protrusion 21, causing the installation housing 61 to move upward from the bottom of the panel 3. As the installation housing 61 moves, it drives the driven threaded pipe 64 to move. Since the driven threaded pipe 64 is configured to engage with the threaded stud 63, it rotates on the outer side of the support column 65. As the driven threaded pipe 64 rotates, it pushes the third moving seat 66 to move, which in turn moves the third metal pin 67 out from the inner side of the installation housing 61. When the third guide block 62 reaches the top plane of the guide protrusion 21, the third metal pin 67 can be connected to the corresponding socket. To retract the third metal pin 67, rotate the rotating housing 2. The installation housing 61 will slide down along the other inclined surface of the guide protrusion 21 under the action of the reset spring 32, causing the driven threaded pipe 64 to rotate in the opposite direction, and the third metal pin 67 will be retracted into the installation housing 61.

Compared with related technologies, the plug adapter of the present disclosure has the following beneficial effects.

Through the mutual cooperation of the components, such as the housing 1, the rotating housing 2, the guide protrusion 21, the panel 3, the guide rods 31, the reset springs 32, the first plug assembly 4, the second plug assembly 5, and the third plug assembly 6, when in use, users do not need to carry multiple plugs of different specifications. By simply turning the rotating housing 2, it can switch between different plug assemblies, ensuring compatibility with various power sockets in different countries. This can effectively reduce the luggage burden during travel and also can reduce the risk of electronic device usage being affected by lost plugs.

Figure 9:
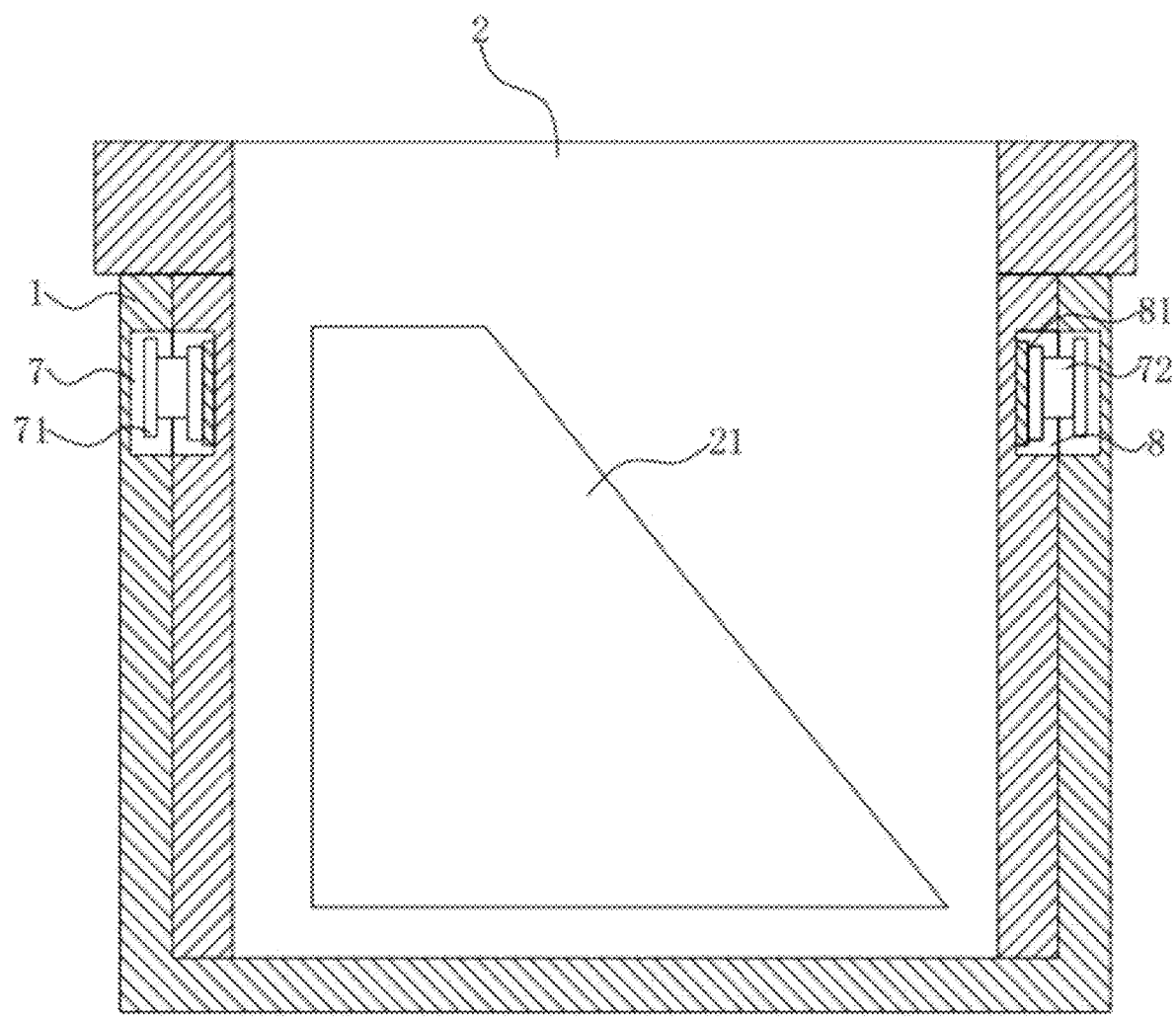
FIG. 9 shows another structural schematic diagram of the plug adapter in accordance with some embodiments of the present disclosure.
Figure 10:
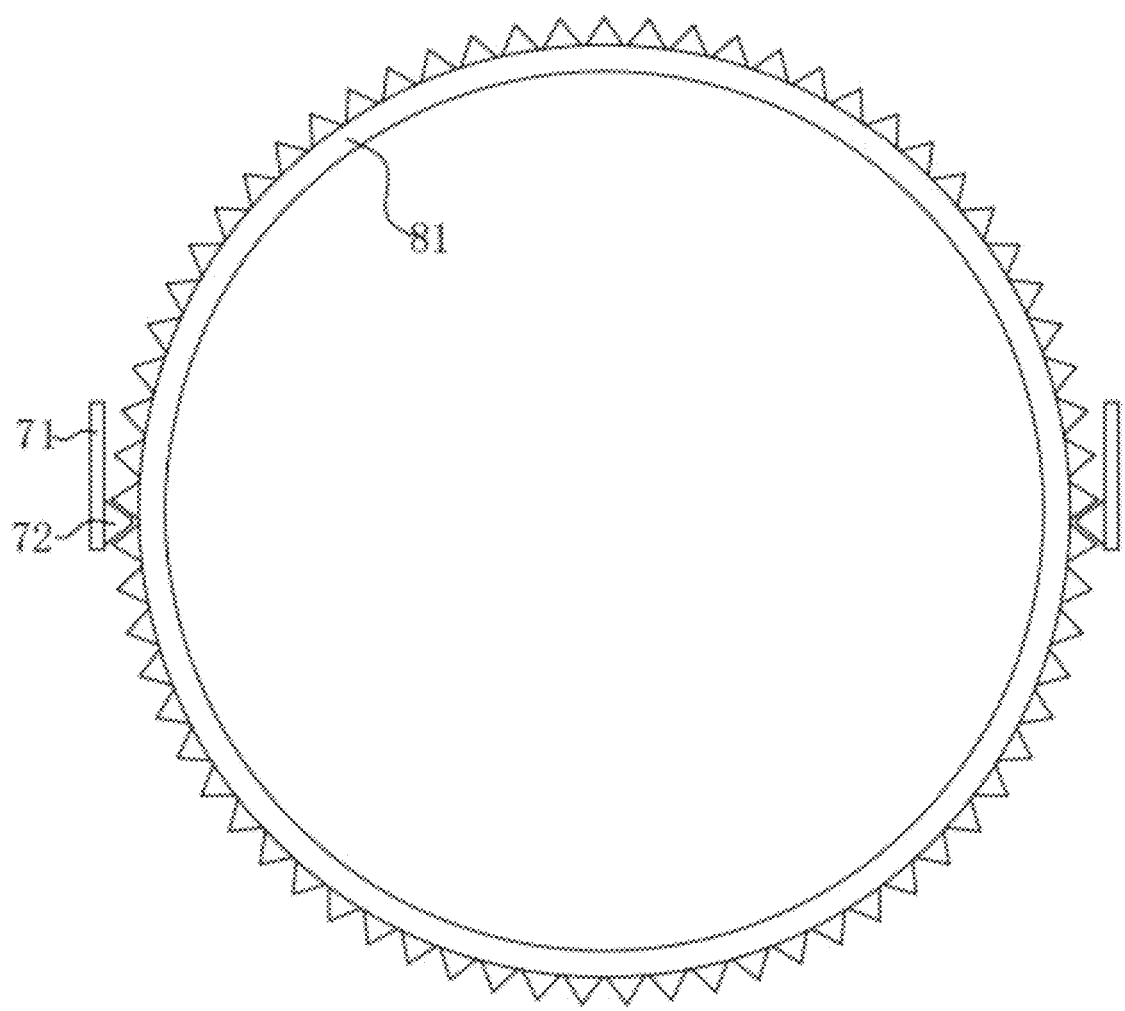
FIG. 10 shows a top view of a gear ring, an elastic plate and a toothed block shown in FIG. 9.

Referring to FIG. 9 and FIG. 10, which show another structural schematic diagram of the plug adapter in accordance with some embodiments of the present disclosure, its main structure is the same as described above, except for the following components.

Specifically, in some other embodiments of the present disclosure, a plug adapter is provided, in addition to the components mentioned above, it further includes an elastic sheet 71, toothed blocks 72, and a gear ring 81. The toothed blocks 72 are configured to engage with a periphery of the gear ring 81, and the elastic sheet 71 is fixedly installed on a side of the toothed blocks 72.

The inner wall of the housing 1 is provided with a mounting groove 7, and the outer side of the rotating housing 2 is provided with a groove 8.

The elastic sheet 71 is fixedly installed on an inner wall of the mounting groove 7, and the gear ring 81 is fixedly installed on an inner wall of the groove 8.

The working principle of the plug adapter of the present disclosure is described as follows.

When the rotating housing 2 is rotated, it drives the gear ring 81, which is fixed in the groove 8 on its outer side, to rotate synchronously. Since the gear ring 81 and the toothed blocks 72 are configured to be meshed with each other, the rotation of the gear ring 81 pushes the toothed blocks 72. The elastic sheet 71 is fixed on the side of the toothed block 72, and is deformed under the push from the gear ring 81.

As the rotating housing 2 continues to rotate, the toothed blocks 72, under the combined force of the elastic sheet 71 and the thrust from the gear ring 81, repeatedly are engaged with different tooth slots of the gear ring 81. As the rotating housing 2 rotates, the user can feel a jolt when the toothed blocks 72 are engaged with the tooth slot, providing feedback on the rotation of the rotating housing 2, allowing the user to clearly understand the progress of the rotation operation.

When the rotating housing 2 is turned to the appropriate position, the toothed blocks 72 will engage with corresponding tooth slots of the gear ring 81. At this time, the elastic sheet 71 is in a deformed state, and its elasticity ensures that the toothed blocks 72 are securely engaged in the tooth slots. This operation provides a certain level of positioning between the housing 1 and the rotating housing 2, preventing the rotating housing 2 from changing the position of the plug assembly due to accidental rotation, thus ensuring the stability of the plug during use.

Compared with related technologies, the plug adapter of the present disclosure at least has the following beneficial effects.

Through the mutual cooperation of the components, such as the elastic sheet 71, toothed blocks 72, and the gear ring 81, during use, it provides clear feedback for the rotation operation. When the user rotates the rotating housing 2 to switch between different plug assemblies, it can clearly perceive the progress and position changes through this feedback, avoiding issues caused by over-rotation or under-rotation, thus enhancing the convenience and accuracy of the operation.

Secondly, it plays a limiting role. After rotating the rotary housing 2 to expose a required plug assembly and align it with the socket, it can effectively prevent the rotary housing 2 from turning accidentally, ensure that the plug always maintains the correct connection state during use, and improve the safety and reliability of use.

The above mentioned are only embodiments of the present disclosure, and do not limit the scope of the present disclosure. Any equivalent structure or equivalent process transformation made by using the contents of the specification and drawings of the present disclosure, or directly or indirectly applied to other related technical fields, are also included in the scope of protection the present invention.

The invention claimed is:

1. A plug adapter, comprising a housing, a rotating housing, a panel, a first plug assembly, a second plug assembly, and a third plug assembly;
wherein the rotating housing is rotatably connected to an inner wall of the housing, the panel is disposed over the rotating housing, and the first, the second, and the third plug assemblies are disposed within the rotating housing and are arranged below the panel;
wherein a guide protrusion is disposed on the inner wall of the rotating housing and is configured to assist the first, the second and the third plug assemblies to move upward, respectively;
wherein multiple guide rods are disposed below the panel and are configured to guide an axial movement of the first, the second, and the third plug assemblies, respectively; and
wherein the guide rods are sleeved with reset springs, and the reset springs are configured to reset the first, the second, and the third plug assemblies, respectively.

2. The plug adapter according to claim 1, wherein the first plug assembly comprises a first moving seat, a first metal pin, a first guide block, and a fourth moving seat;
wherein the first moving seat and the fourth moving seat are slidably connected to an outer side of the guide rods, respectively; and the first metal pin is fixedly installed on a top of the first moving seat and the fourth moving seat; and
wherein the first guide block is fixedly installed on a side of the first moving seat, one of the reset springs is arranged at the top of the first moving seat and the fourth moving seat.

3. The plug adapter according to claim 1, wherein the second plug assembly comprises a second moving seat, a second guide block, and a second metal pin; and
wherein the second moving seat is slidably connected to an outer side of the guide rods, the second guide block is fixedly installed on a side of the second moving seat, the second metal pin is rotatably connected to a top of the second moving seat, and the reset springs are arranged at the top of the second moving seat.

4. The plug adapter according to claim 1, wherein the third plug assembly comprises an installation housing, a third guide block, a threaded stud, a driven threaded pipe, a support column, a third moving seat, and a third metal pin;
wherein the installation housing is slidably connected to an outer side of the guide rods, and the third guide block is fixedly installed on an outer wall of the installation housing;
wherein a bottom of the threaded stud is fixedly installed on a bottom of the inner wall of the outer housing, and the driven threaded pipe is configured to engage with a side of the threaded stud;
wherein the support column is rotatably connected to an inner wall of the driven threaded pipe, with its top and bottom being fixedly installed at a top and a bottom of the inner wall of the installation housing, respectively; and
wherein the third moving seat is configured to engage with an outer side of the driven threaded pipe, the third metal pin is fixedly installed on a top of the third moving seat, and one of the reset springs is located on a side of the top of the installation housing.

5. The plug adapter according to claim 1, wherein further comprises an elastic sheet, toothed blocks and a gear ring; wherein the toothed blocks are configured to engage with a periphery of the gear ring, and the elastic sheet is fixedly installed on a side of the toothed blocks.

6. The plug adapter according to claim 5, wherein a mounting groove is provided on the inner wall of the housing and a groove is provided on the outer side of the rotary housing.

7. The plug adapter according to claim 6, wherein the elastic sheet is fixedly installed on an inner wall of the mounting groove, and the gear ring is fixedly installed on an inner wall of the groove.

* * * * *